United States Patent [19]

Knoll

[11] 4,283,945

[45] Aug. 18, 1981

[54] VOLUME MEASURING APPARATUS

[75] Inventor: Dieter B. Knoll, Kronberg, Fed. Rep. of Germany

[73] Assignee: Hewlett-Packard Company, Palo Alto, Calif.

[21] Appl. No.: 110,272

[22] Filed: Jan. 7, 1980

[30] Foreign Application Priority Data

Feb. 8, 1979 [DE] Fed. Rep. of Germany ... 7903413[U]

[51] Int. Cl.³ .............................................. G01F 11/02
[52] U.S. Cl. ..................................... 73/269; 73/61.1 C
[58] Field of Search ................. 73/422 GC, 426, 718, 73/724, 269, 61.1 C

[56] References Cited

U.S. PATENT DOCUMENTS 3,618,390 11/1971 Frick ....................................... 73/718

Primary Examiner—James J. Gill
Attorney, Agent, or Firm—Stephen P. Fox

[57] ABSTRACT

A volumeter, in particular for use in liquid chromatography comprises a metering chamber for the volume to be measured. Another chamber is separated from the metering chamber by a resilient diaphragm and forms an electric capacitor. The capacitance of this capacitor is changed in accordance to deviations of the diaphragm from its true position.

1 Claim, 1 Drawing Figure

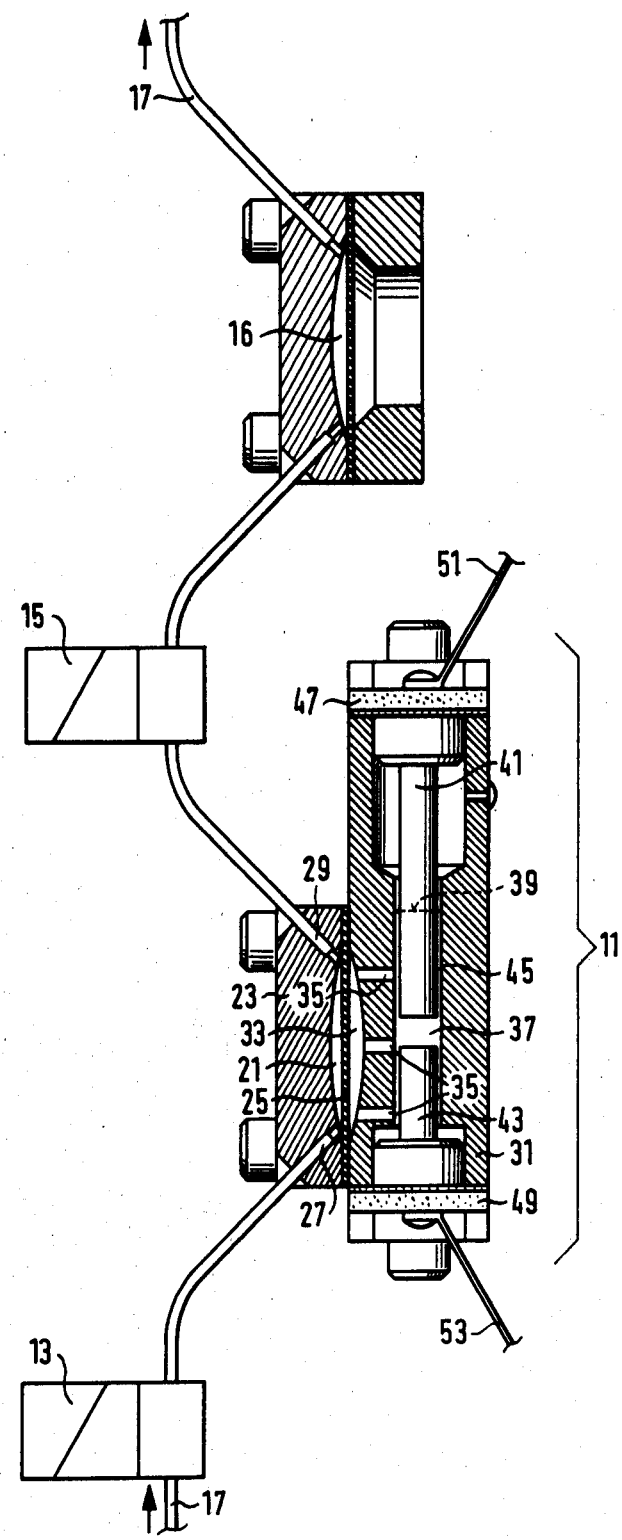

VOLUME MEASURING APPARATUS

BACKGROUND AND SUMMARY OF THE INVENTION

Volumeters and flow meters have been known heretofore in many different configurations. However, the dosing and metering of very small volumes raises still considerable difficulties. This problem is particularly encountered in liquid chromatography.

The present invention provides a device capable of measuring very small volumes and/or volume differences with exactitude and high resolving power. Apart from offering high exactitude, the device of the invention is of very simple design and can be easily integrated into a flow-metering system.

The volumeter according to a preferred embodiment of the invention comprises a metering chamber for the volume to be measured. Another chamber is separated from the metering chamber by a resilient diaphragm and forms an electric capacitor. The capacitance of this capacitor is changed in accordance to deviations of the diaphragm from its true position.

BRIEF DESCRIPTION OF THE DRAWING

The drawing shows a volumeter integrated into the circuit of the solvent flow in a liquid chromatograph.

DESCRIPTION OF THE PREFERRED EMBODIMENT

In the drawing, the reference number 11 indicates a volumeter cell which in the present example is integrated into a line 17 for the solvent flow in a liquid chromatograph (not shown).

Volumeter cell 11 comprises a metering chamber 21 defined by a fixed housing cover 23 and a resilient diaphragm 25. Housing cover 23 comprises connection openings 27 and 29 for the liquid to be metered.

Housing cover 23 is fixed to a capacitor housing 31. The latter is provided, on the side of the diaphragm 25 opposite the metering chamber 21, with a depression 33 which is connected via channels 35 to a capacitor cavity 37. Depression 33, channels 35 and capacitor cavity 37 are filled to the level indicated by reference number 39 with a liquid having a high dielectricity coefficient (in the easiest case, this may be water).

Capacitor cavity 37 has projecting into it capacitor electrodes 41 and 43 of rod-like configuration, leaving between themselves and the wall of the cavity 37 only a narrow annular gap 45. Electrodes 41 and 43 are connected to the outer connection lines 51 and 53 via insulating ducts 47 and 49. As the capacitor housing 31 is electrically conductive, the arrangement of the drawing forms two capacitors connected in series, the first one consisting of electrodes 41 and housing 31 and the second one consisting of housing 31 and electrode 43.

Now, when the diaphragm 25 moves relative to the wall of the depression 33, in response to the varying volume in the metering chamber 21, the liquid level of the dielectric in the capacitor cavity 37 will rise or drop correspondingly, increasing or reducing as a result the capacitance of the capacitor formed by electrode 41 and housing 31. Thus, said capacitance indicates the volume of the liquid in the metering chamber 21. A high sensitivity of this metering arrangement can be achieved by a suitable selection of the dielectric and of the width of the annular gap 45.

The drawing further shows how the volumeter of the invention can be developed to form a flow-metering and/or dosing device in the flow of the solvent in a liquid chromatograph. To this end, the solenoid valves 13 and 15 are alternately opened and closed. When valve 15 is closed and the valve 13 is opened, the solvent enters the metering chamber 21. The resulting increase of the volume in the metering chamber 21 can be determined as described above. Thereafter, valve 13 is closed and valve 15 is opened so as to permit the solvent to leave the metering chamber 21. And again, the resulting decrease in volume can be determined. Provided the two valves 13 and 15 cannot be opened simultaneously, the flow quantity (volume per unit of time) in line 17 can be derived from these measured values. In addition, a pressure reservoir 16 of conventional design may be provided in line 17 so as to render the flow more uniform.

I claim:

1. A volumeter, in particular for use in liquid chromatography, comprising:
   a first metering chamber for the volume to be measured;
   a second chamber being separated from the first chamber by a resilient diaphragm and forming an electric capacitor; said second chamber including:
   at least two capacitor electrodes insulated against each other; and
   a dielectric liquid in contact with the diaphragm and filling the gap between the electrodes to a higher or lower degree in response to deviations of the diaphragm;
   wherein any deviation of the diaphragm resulting from volume variations in the first chamber will change the capacitance of the capacitor.

* * * * *

UNITED STATES PATENT AND TRADEMARK OFFICE
CERTIFICATE OF CORRECTION

PATENT NO. : 4,283,945
DATED : August 18, 1981
INVENTOR(S) : Dieter B. Knoll

It is certified that error appears in the above-identified patent and that said Letters Patent are hereby corrected as shown below:

On the title page at line "[73]", the assignee should be listed as -- Hewlett-Packard GmbH, Boblinge, Germany --.

Signed and Sealed this

Nineteenth Day of January 1982

[SEAL]

Attest:

*Attesting Officer*

GERALD J. MOSSINGHOFF

*Commissioner of Patents and Trademarks*